United States Patent [19]
Huang

[11] Patent Number: 5,938,222
[45] Date of Patent: Aug. 17, 1999

[54] HANGER AND BRACKET APPARATUS FOR VEHICLE MUD FLAPS

[75] Inventor: Nan Huang Huang, Rancho Palos Verdes, Calif.

[73] Assignee: Grand General Accessories Manufacturing Inc., Compton, Calif.

[21] Appl. No.: 08/870,088

[22] Filed: Jun. 5, 1997

[51] Int. Cl.[6] .................................................. B62B 9/14
[52] U.S. Cl. ........................................ 280/154; 280/851
[58] Field of Search ................................... 280/851, 848, 280/847, 154, 153.5

[56] References Cited

U.S. PATENT DOCUMENTS

| | | | |
|---|---|---|---|
| 3,388,884 | 6/1968 | Eggler et al. | 280/154 |
| 3,934,901 | 1/1976 | Hammerly | 280/851 |
| 4,180,230 | 12/1979 | Sogoian . | |
| 4,354,690 | 10/1982 | Hanson | 280/851 |
| 4,359,232 | 11/1982 | Maccari, Sr. . | |
| 4,627,594 | 12/1986 | Reed | 280/851 |
| 5,316,191 | 5/1994 | Gibson et al. | 280/851 |

*Primary Examiner*—Robert J. Oberleitner
*Assistant Examiner*—Lynda Jasmin
*Attorney, Agent, or Firm*—Thomas I. Rozsa; Tony D. Chen; Jerry Fong

[57] ABSTRACT

A hanger and bracket apparatus for mounting to a frame of a vehicle and for attachment of a mud flap. The hanger and bracket apparatus comprises a plate member, a bracket member, and a hanger member. The plate member has a pair of slotted channels and a pair of apertures located between the slotted channels. A pair of bolt members are respectively inserted through the pair of apertures on the plate member and threadedly engaged with a pair of nut members for securing the plate member to the frame of the vehicle. The bracket member has two protruding edges for inserting into and permanently affixed to the slotted channels of the plate member respectively and secured to the plate member by welding or soldering material. The bracket member also has a top wall and a bottom wall each having a pair of apertures. The hanger member has a top wall with a pair of apertures and two opposite sidewalls. A pair of screw nuts are permanently affixed to the interior surface of the top wall of the hanger member and correspond with the pair of apertures on the top wall of the hanger member. The hanger member is inserted into the bracket member such that the pair of apertures on the hanger member correspond with the two pairs of apertures on the bracket member. A pair of bolt members are respectively inserted through the pair of apertures on the top wall of the bracket member and pair of apertures on the top wall of the hanger member and threadedly engaged to the pair of screw nuts affixed on the top wall of the hanger member, and the pair of bolt members are further inserted through the pair of apertures on the bottom wall of the bracket member and threadedly engaged with another pair of nut members.

11 Claims, 2 Drawing Sheets

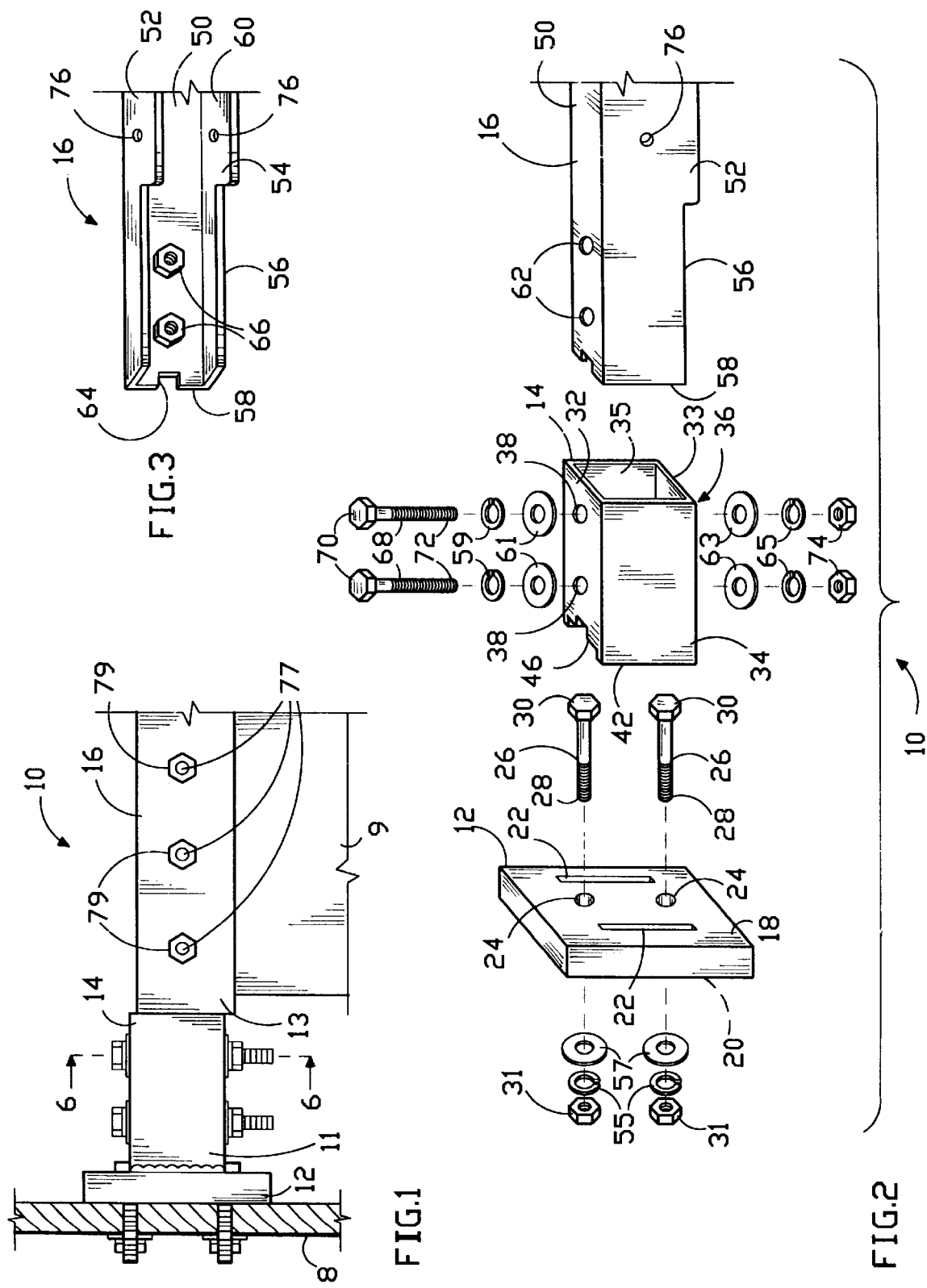

HANGER AND BRACKET APPARATUS FOR VEHICLE MUD FLAPS

BACKGROUND OF THE INVENTION

1. Field of the Invention

The present invention generally relates to the field of accessories for trucks, tractors, trailers, or the like. More particularly, the present invention relates to the field of a hanger and bracket apparatus, wherein the bracket is bolted to a truck, tractor, or trailer frame adjacent the wheels thereof and the hanger supports a mud flap therefrom.

2. Description of the Prior Art

Specifically, hangers and brackets for trucks, tractors, trailers, or the like are well known in the art. Referring to FIG. 5, there is depicted a prior art bracket member 2 which is commonly welded or soldered to a vertical flat plate member 3 at one of the open ends of the bracket member 2. The flat plate member 3 is then mounted to a frame of a truck, tractor, trailer, or the like adjacent the wheels. The disadvantage with this traditional way of attaching the bracket member 2 to the plate member 3 is that the bracket member 2 can easily be break-off from the plate member 3 after time because only thing holding the two parts together is the welding material 7 as shown.

Referring to FIG. 7, there is depicted a cross-sectional view of a prior art mud flap hanger member 4 with a L-shaped cross-sectional configuration which is installed within the bracket member 2 which has a rectangular shaped cross-sectional configuration and secured thereto by two bolts 5 and nuts 6 (only one is shown for each). The disadvantage of this manner of attachment of the prior art mud flap hanger member 4 is that it is loosely held within the bracket member 2 such that the portion within the bracket member 2 makes rattling sounds when the vehicle is traveling on the road.

The following two (2) prior art patents are found to be pertinent to the field of the present invention:

1. U.S. Pat. No. 4,180,230 issued to Sogoian on Dec. 25, 1979 for "Hanger For Vehicle Mud Flaps" (hereafter the "Sogoian Patent"); and 2. U.S. Pat. No. 4,359,232 issued to Maccari, Sr. on Nov. 16, 1982 for "Mud Flaps Brackets For Trucks, Tractors, Trailers And The Like" (hereafter the "Maccari Patent").

The Sogoian Patent discloses a hanger for vehicle mud flaps. It comprises a first support member and a second support member. One end of the first support member is secured to the vehicle while the second support member is telescopically mounted to the free end of the first support member. A spring resiliently urges the second support member axially outward from the first support member while permitting retraction of the second support member relative to the first support member.

The Maccari Patent discloses mud flap brackets for trucks, tractors, trailers and the like. The bracket is mounted to extend out from the frame, in back of the wheels and includes an outer end portion that can be deformed and returned to normal position without damage to the bracket or the mud flap.

It is desirable to have a very efficient and also very effective design and construction of a hanger and bracket apparatus which holds a conventional mud flap therefrom. It is also desirable to provide a hanger and bracket apparatus which overcomes the disadvantages of the prior art devices as discussed above.

SUMMARY OF THE INVENTION

The present invention is a hanger and bracket apparatus for mounting to a frame of a vehicle and for attachment of a mud flap. The hanger and bracket apparatus comprises a plate member, a bracket member, and an elongated hanger member.

The plate member has a pair of slotted means and a pair of apertures located one above the other and between the slotted means. A pair of bolt members are respectively inserted through the pair of apertures on the plate member and threadedly engaged with a pair of nut members for securing the plate member to the frame of the vehicle.

The bracket member has two opposite vertical protruding side edges for inserting into and permanently affixed to the pair of slotted means of the plate member respectively and rigidly secured to the plate member by welding or soldering material. The bracket member also has a top wall and a bottom wall each having a pair of apertures.

The elongated hanger member has a top wall, two opposite sidewalls extending downwardly from the top wall, a proximal portion with a proximal end which has a U-shaped cross-sectional configuration, and a distal portion. The top wall has a pair of apertures extending therethrough and located adjacent to the proximal end. The proximal portion is inserted into the bracket member such that the pair of apertures on the top wall of the hanger member correspond with the two pairs of apertures on the bracket member.

A pair of screw nuts are permanently affixed to the interior surface of the top wall of the hanger member and correspond with the pair of apertures on the top wall of the hanger member.

A pair of bolt members are respectively inserted through the pair of apertures on the top wall of the bracket member and pair of apertures on the top wall of the hanger member and threadedly engaged to the pair of screw nuts affixed on the top wall of the hanger member, such that the top wall of the hanger member is secured to and abuts against the bracket member, and the pair of bolt members are further inserted through the pair of apertures on the bottom wall of the bracket member and threadedly engaged with another pair of nut members. A mud flap can be then secured onto the distal portion of the hanger member so that the mud flap hangs downwardly from the hanger member.

It is an object of the present invention to provide a hanger and bracket apparatus which comprises a plate member and a bracket member, where the plate member has a pair of slotted channels or grooves for accommodating a protruding end portion of the bracket member for securing it to the plate member by welding material. The flat plate member is then mounted to a frame of a truck, tractor, trailer, or the like adjacent the wheels.

It is a further object of the present invention to provide a hanger and bracket apparatus which comprises a hanger member with internal built-in screw nuts so that the hanger member is securely fastened within the bracket member, thereby eliminating the prior art rattling noise associated with the prior art hanger members.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a side elevational view of the present invention hanger and bracket apparatus mounted to a frame member of a vehicle;

FIG. 2 is an exploded view of the present invention hanger and bracket apparatus;

FIG. 3 is a perspective view of the hanger member in accordance with the present invention hanger and bracket apparatus, showing the underside of the hanger part;

DESCRIPTION OF THE PREFERRED EMBODIMENT

Figure 4:
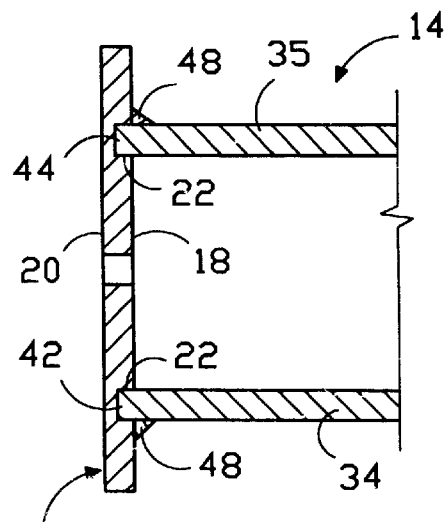
FIG. 4 is an illustration of the connection between the plate member and the bracket member of the bracket part in accordance with present invention hanger and bracket apparatus.
Figure 5:
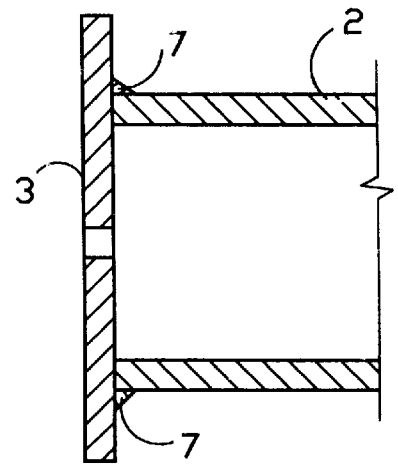
FIG. 5 is an illustration of the connection between the plate member and the bracket member of a prior art bracket.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is depicted at 10 the present invention hanger and bracket apparatus which may be mounted to a frame part 8 of a vehicle (not shown) and for attachment of a conventional mud flap 9. The mud flap 9 may be attached to the hanger and bracket apparatus 10 by conventional means, such as bolt 77 and nut 79 members. The hanger and bracket apparatus 10 comprises a bracket part 11 and a hanger part 13. The bracket part 11 includes a vertical flat plate member 12 and a longitudinal bracket member 14. The hanger part 13 includes an elongated longitudinal bar member 16.

Referring to FIGS. 1 and 2, the flat plate member 12 has a front side 18, a back side 20, a pair of opposite slotted channels or grooves 22 located on the front side 18, and a pair of spared apart apertures 24 extending through from the front side 18 to the back side 20 and located between the pair of opposite slotted channels 22.

There are provided a pair of bracket bolt members 26, each having a threaded section 28 and a head section 30. The bracket bolt members 26 are respectively inserted through the pair of apertures 24 on the plate member 12 such that their head sections 30 abut against the front side 18 of the plate member 12.

Figure 6:
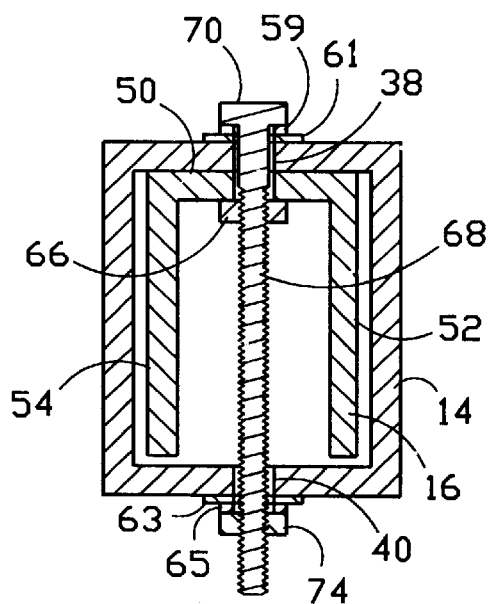
FIG. 6 is a cross-sectional view taken along line 6—6 of FIG. 1.
Figure 7:
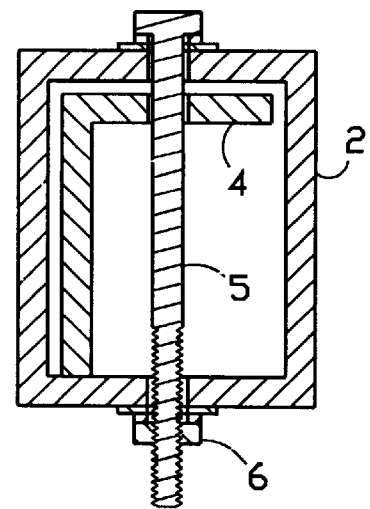
FIG. 7 is a cross-sectional view of a prior art hanger member installed within a prior art bracket member.

Referring to FIGS. 2, 4 and 6, the bracket member 14 has a top wall 32, a bottom wall 33, and two opposite and parallel sidewalls 34 and 35. The walls 32, 33, 34, and 35 are integrally connected together at their periphery edges to form a hollow rectangular shaped frame or box 36. The top and bottom walls 32 and 33 each has a pair of spaced apart aligned apertures 38 and 40 extending therethrough (see FIGS. 2 and 6). The pair of apertures 38 on the top wall 32 are respectively aligned with and correspond to the pair of apertures 40 on the bottom wall 33. The two sidewalls 34 and 35 have respective protruding proximal edges 42 and 44 which extend further beyond the proximal edges of the top and bottom walls 32 and 33 for inserting into the pair of slotted channels 22 on the plate member 12 respectively. The proximal edges of the top and bottom walls 32 and 33 are each provided with a recess 46 for accommodating the head sections 30 of the pair of bracket bolt members 26 respectively (see FIG. 1). The protruding edges 42 and 44 of the sidewalls 34, 35 of the bracket member 14 are respectively inserted into the pair of slotted channels 22 of the plate member 12 such that the proximal edges of the top and bottom walls 32, 33 of the bracket member 14 abut against the front side 18 of the plate member 12 with the head sections 30 of the bracket bolt members 26 respectively received in the recesses 46 of the proximal edges of the top and bottom, edges 32 and 33, and then the bracket member 14 is permanently affixed to the plate member 12 along the proximal edges of its walls together with the head sections 30 of the bracket bolt members 26. This manner of connection between the bracket member 14 ,md the plate member 12 (as shown in FIG. 4) is much stronger and harder to break-off as compared to the prior art connection (as shown in FIG. 7) by welding material 48 or any other suitable means, for example, soldering material, such that the bracket member 14 extends perpendicularly from the plate member 12.

Once the bracket member 14 is permanently affixed to the plate member 12 together with the bracket bolt members 26 by, for example, welding or soldering, which creates a unitary piece with the threaded sections 28 of the bracket bolt members 26 extending oat from the back side 20 of the plate member 12. This unitary piece can be then attached to the vehicle frame member 8 by inserting the threaded sections 28 of the bracket bolt members 26 through the holes on the vehicle frame member 8 and tightened thereon by nut members 31. A pair of washers 55 and lock washers 57 may be utilized with the nut members 31.

Referring to FIGS. 2, 3 and 6, the longitudinal bar member 16 has a top wall 50, two opposite sidewalls 52 and 54 integrally connected to and extending downwardly from the top wall 50, a proximal portion 56 with a U-shaped cross section proximal end 58, and a distal portion 60. The top wall 50 has a pair of spaced apart apertures 62 extending therethrough and located on the proximal portion 56 and adjacent to the U-shaped cross-section proximal end 58. A notch 64 is provided at the proximal end of the top wall 50 of the bar member 16 for accommodating the head section 30 of one of the two bracket bolt members 26.

Referring to FIG. 3, there are depicted a pair of screw nuts 66 which are permanently affixed to the interior side of the top wall 50 of the longitudinal bar member 16 and respectively correspond with the pair of apertures 62 on the top wall 50 of the bar member 16. The pair of screw nuts 66 may be welded thereto or by any other suitable means known to one skilled in the art.

Referring to FIGS. 1 and 2, the proximal portion 56 of the longitudinal bar member 16 is inserted into the rectangular shaped frame 36 of the bracket member 14 such that the pair of apertures 62 on the top wall 50 of the bar member 16 correspond with the pair of apertures 38 on the top wall 32 and the pair of apertures 40 on the bottom wall 33 of the bracket member 14.

There are provided a pair of hanger bolt members 68, each having a head second 70 and a threaded section 72. The pair of hanger bolt members 68 are respectively inserted through the pair of apertures 38 on the bracket member 14 and also through the pair of apertures 62 on the bar member 16, and threadedly engaged with the pair of screw nuts 66 on the interior side of the top wall 50 of the bar member 16. When the second bolt members 68 are tighten down, the top wall 50 of the bar member 16 abuts against the top wall 32 of the bracket member 14, and thereby provide a tightened engagement between the bracket member 14 and the bar member 16 (see FIG. 6) to prevent the rattling noise existed when using a prior art hanger (as shown in FIG. 7). The pair of hanger bolt members 68 are long enough to be further inserted through the pair of apertures 40 on the bottom wall 33 of the bracket member 14 and threadedly engaged with a pair of nut members 74 to secured the longitudinal bar member 16 within the rectangular shaped frame 36 of the bracket member 14. A pair of washers 61 and lock washers 59 may be utilized with the nut members 66. Also, a pair of washers 63 and lock washers 65 may be utilized with the nut members 74.

The distal portion 60 of the longitudinal bar member 16 has means for securing the conventional mud flap 9 so that the mud flap 9 hangs downwardly from the bar member 16. The distal portion 60 is provided with several apertures 76 extending through the sidewalls 52 and 54 of the bar member 16 for allowing flap bolt members 77 to be inserted through the apertures 76 on the sidewalls 52 and 54, and threadedly engaged with nut members 79 respectively (see FIG. 1).

The present invention conforms to conventional forms of manufacture or any other conventional way known to one skilled in the art, and is of simple construction and is easy to use.

Defined in detail, the present invention is a a hanger and bracket apparatus for mounting to a frame of a vehicle and for attachment of a mud flap, the apparatus comprising: (a) a bracket part and a hanger part; (b) said bracket part including a flat plate member having a pair of opposite slotted channels and a pair of spaced apart apertures located between the pair of slotted channels and extending through the plate member; (c) a first bolt member respectively inserted to each one of said pair of apertures on said plate member and threadedly engaged with a first nut member for securing said plate member to said frame of said vehicle; (d) said bracket part further including a longitudinal bracket member having a top wall, a bottom wall and two opposite sidewalls, the walls integrally connected together at their periphery edges to form a hollow rectangular shaped frame, the top and bottom walls each having a pair of apertures extending therethrough and aligned with and corresponding with each other, each sidewall having a protruding proximal edge respectively inserted into and permanently affixed to each one of said pair of slotted channels of said plate member, such that the bracket member extends perpendicularly from said plate member; (e) said hanger part including an elongated longitudinal bar member having a top wall, two opposite sidewalls integrally connected to and extending downwardly from the top wall, a proximal portion with a U-shaped cross-section proximal end, and a distal portion, the top wall having a pair of apertures extending therethrough and located adjacent to the U-shaped cross-section proximal end, the proximal portion inserted into said rectangular shaped frame of said bracket member such that the pair of apertures on the top wall of the bar member correspond with each said pair of apertures on said top and bottom walls of said bracket member; (f) a pair of screw nuts permanently affixed to the interior surface of said top wall of said longitudinal bar member and corresponding with said pair of apertures on said top wall of said bar member respectively; (g) a second bolt member respectively inserted into each one of said pair of apertures on said bracket member and said longitudinal bar member and threadedly engaged to each one of said pair of screw nuts on said top wall of said bar member, such that said top wall of said bar member abuts against said top wall of said bracket member, and the second bolt member further inserted through each one of said pair of apertures on said bottom wall of said bracket member and threadedly engaged with a second nut member to secured said longitudinal bar member within said rectangular shaped frame of said bracket member; and (h) means for securing said mud flap onto said distal portion of said longitudinal bar member so that said mud flap hangs downwardly from said bar member.

Defiled broadly, the present invention is a hanger and bracket apparatus for mounting to a frame of a vehicle and for attachment of a mud flap, the apparatus comprising: (a) a bracket part and a hanger part; (b) said bracket part including a flat plate member having at least two opposite slotted grooves and at least two apertures extending through the plate member and between the least two slotted grooves; (c) a first bolt member respectively inserted to each one of said two apertures on said plate member and threadedly egagaged with a first nut member for securing said plate member to said frame of said vehicle; (d) said bracket part further including a bracket member having at least four walls, a respective two of the four walls each having a pair of apertures extending therethrough and aligned with and corresponding with each other, the other respective two of the at least four walls each having a protruding edge respectively inserted into and permanently affixed to each one of said at least two slotted grooves of said plate member; (e) said hanger part including an elongated bar member having at least three walls, a respective one of the at least three walls having a pair of apertures extending therethrough, the bar member inserted into said bracket member such that the pair of apertures on the respective one of the at least three walls correspond with said respective two of said at least four walls of said bracket member; (f) a pair of screw nuts permanently affixed to the interior surface of said respective one of said at least three walls of said bar member and corresponding with said pair of apertures on the other respective two of said at least four walls of said bar member respectively; and (g) a second bolt member respectively inserted into each one of said pair of apertures on said bracket member and said bar member and threadedly engaged to each one of said pair of screw nuts on said bar member, such that said bar member abuts against said bracket member, and the second bolt member further inserted through each one of said pair of apertures on one of said respective two of said at least four walls of said bracket member and threadedly engaged with a second nut member to secured said bar member within said bracket member.

Defined more broadly, the present invention is an apparatus for mounting to a frame of a vehicle and for attachment of a mud flap, comprising: (a) a bracket part including a plate member having at least one slotted means; (b) said bracket part further including a hollow bracket member having at least one protruding proximal edge inserted into said at least one slotted means of said plate member as said bracket member is permanently affixed to said plate member; and (c) a hanger part inserted into said hollow bracket member and secured therein.

Defined even more broadly, the present invention is an apparatus for mounting to a frame of a vehicle or the like and for attachment of a mud flap, comprising: (a) a bracket part being attached to said frame of said vehicle; (b) a hanger part attached to said bracket part and having at least one fixed nut thereto; and (c) means for threadedly engaging said at least one fixed nut to secure said hanger part to said bracket part.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A hanger and bracket apparatus for mounting to a frame of a vehicle and for attachment of a mud flap, the apparatus comprising:

a. a bracket part and a hanger part;

b. said bracket part including a flat plate member having a pair of opposite slotted channels and a pair of spaced apart apertures located between the pair of slotted channels and extending through the plate member;

c. a first bolt member respectively inserted to each one of said pair of apertures on said plate member and threadedly engaged with a first nut member for securing said plate member to said frame of said vehicle;

d. said bracket part further including a longitudinal bracket member having a top wall, a bottom wall and two opposite sidewalls, the walls integrally connected together at their periphery edges to form a hollow rectangular shaped frame, the top and bottom walls each having a pair of apertures extending therethrough and aligned with and corresponding with each other, each sidewall having a protruding proximal edge respectively inserted into and permanently affixed to each one of said pair of slotted channels of said plate member, such that the bracket member extends perpendicularly from said plate member;

e. said hanger part including an elongated longitudinal bar member having a top wall, two opposite sidewalls integrally connected to and extending downwardly from the top wall, a proximal portion with a U-shaped cross-section proximal end, and a distal portion, the top wall having a pair of apertures extending therethrough and located adjacent to the U-shaped cross-section proximal end, the proximal portion inserted into said rectangular shaped frame of said bracket member such that the pair of apertures on the top wall of the bar member correspond with each said pair of apertures on said top and bottom walls of said bracket member;

f. a pair of screw nuts permanently affixed to the interior surface of said top wall of said longitudinal bar member and corresponding with said pair of apertures on said top wall of said bar member respectively;

g. a second bolt member respectively inserted into each one of said pair of apertures on said bracket member and said longitudinal bar member and threadedly engaged to each one of said pair of screw nuts on said top wall of said bar member, such that said top wall of said bar member abuts against said top wall of said bracket member, and the second bolt member further inserted through each one of said pair of apertures on said bottom wall of said bracket member and threadedly engaged with a second nut member to secured said longitudinal bar member within said rectangular shaped frame of said bracket member; and h. means for securing said mud flap onto said distal portion of said longitudinal bar member so that said mud flap hangs downwardly from said bar member.

2. The apparatus in accordance with claim 1 wherein said protruding proximal edge of each of said sidewalls of said bracket member permanently affixed to each one of said pair of slotted channels on said plate member respectively by welding means.

3. A hanger and bracket apparatus for mounting to a frame of a vehicle and for attachment of a mud flap, the apparatus comprising:

a. a bracket part and a hanger part;

b. said bracket part including a flat plate member having at least two opposite slotted grooves and at least two apertures extending through the plate member and between the least two slotted grooves;

c. a first bolt member respectively inserted to each one of said two apertures on said plate member and threadedly engaged with a first nut member for securing said plate member to said frame of said vehicle;

d. said bracket part further including a bracket member having at least four walls, a respective two of the four walls each having a pair of apertures extending therethrough and aligned with and corresponding with each other, the other respective two of the at least four walls each having a protruding edge respectively inserted into and permanently affixed to each one of said at least two slotted grooves of said plate member;

e. said hanger part including an elongated bar member having at least three walls, a respective one of the at least three walls having a pair of apertures extending therethrough, the bar member inserted into said bracket member such that the pair of apertures on the respective one of the at least three walls correspond with said respective two of said at least four walls of said bracket member;

f. a pair of screw nuts permanently affixed to the interior surface of said respective one of said at least three walls of said bar member and corresponding with said pair of apertures on the other respective two of said at least four walls of said bar member respectively; and g. a second bolt member respectively inserted into each one of said pair of apertures on said bracket member and said bar member and threadedly engaged to each one of said pair of screw nuts on said bar member, such that said bar member abuts against said bracket member, and the second bolt member further inserted through each one of said pair of apertures on one of said respective two of said at least four walls of said bracket member and threadedly engaged with a second nut member to secured said bar member within said bracket member.

4. The apparatus in accordance with claim 3 further comprising means for securing said mud flap onto said bar member so that said mud flap hangs downwardly from said bar member.

5. The apparatus in accordance with claim 3 wherein each said protruding edge of the other respective two of said at least four walls of said bracket member permanently affixed to said at least two slotted grooves on said plate member respectively by welding means.

6. An apparatus for mounting to a frame of a vehicle and for attachment of a mud flap, comprising:

a. a bracket part including a plate member having at least one slotted means;

b. said bracket part further including a hollow bracket member having at least one protruding proximal edge inserted into said at least one slotted means of said plate member as said bracket member is permanently affixed to said plate member; and c. a hanger part inserted into said hollow bracket member and secured therein.

7. The apparatus in accordance with claim 6 further comprising means for securing said plate member to said frame of said vehicle.

8. The apparatus in accordance with claim 6 wherein said at least one protruding proximal edge is secured to said at least one slotted means on said plate member by welding means.

9. The apparatus in accordance with claim 7 wherein said means for securing said plate member to said frame of said vehicle includes a pair of bolts inserted through a pair of apertures on said plate member respectively and threadedly engaged with a pair of nuts respectively.

10. The apparatus in accordance with claim 6 further comprising means for securing said mud flap onto said hanger part so that said mud flap hangs downwardly from said hanger part.

11. The apparatus in accordance with claim 6 wherein said means for securing to said bracket member includes a pair of screw nuts permanently affixed to the interior surface of said hanger part and another pair of bolts threadedly engaged with the pair of screw nuts on said hanger part, such that said hanger part abuts against said bracket member, and the another pair of bolts further threadedly engaged with another pair of nuts.

\* \* \* \* \*